(No Model.) 3 Sheets—Sheet 1.

M. H. COFFIN.
VOTING MACHINE.

No. 373,814. Patented Nov. 29, 1887.

Witnesses.
Frank S. Mason
E. G. Alexander

Inventor.
Melvin H. Coffin
by R. H. Reeves
attorney (No Model.)

M. H. COFFIN.
VOTING MACHINE.

No. 373,814. Patented Nov. 29, 1887.

Witnesses.
Frank S. Mason.
E. G. Alexander.

Inventor.
Melvin H. Coffin.
by A. H. Pierce,
Attorney.

(No Model.)  3 Sheets—Sheet 3.

M. H. COFFIN.
VOTING MACHINE.

No. 373,814.  Patented Nov. 29, 1887.

Witnesses.  Inventor
Frank L. Mason  Melvin H. Coffin,
Ed. S. Alexander  by A. N. Spencer,
   attorney

UNITED STATES PATENT OFFICE.

MELVIN H. COFFIN, OF BOSTON, MASSACHUSETTS.

VOTING-MACHINE.

SPECIFICATION forming part of Letters Patent No. 373,814, dated November 29, 1887.

Application filed November 29, 1886. Serial No. 220,114. (No model.)

*To all whom it may concern:*

Be it known that I, MELVIN H. COFFIN, of Boston, in the county of Suffolk and State of Massachusetts, have invented certain new and useful Improvements in Ballot-Boxes, of which the following, taken in connection with the accompanying drawings, is a specification.

The object of this invention is to furnish an improved ballot-box adapted to receive between two feed-rollers ballots, one by one, impress upon each by a reciprocating stamp a suitable identifying-mark, register accurately the number of ballots cast, and sound an alarm on the deposit of each within the receptacle.

The essential peculiarity of my improvement is the combination of two grooved feed-rollers, which seize the end of the ballot, and two pivoted tripping-wires which at their free ends cross each other in the grooves at the bite of the rollers, and thus prevent the advancing ballot from being crowded into one of the grooves and clogging the machine, which is liable to occur without such crossing wires. The extremities of these wires are curved downwardly, so that one presses on one side of the ballot and one on the other side as it passes, and the swinging movement of these wires, with the rock-shafts to which they are fixed, serves to trip or throw into action a clutch mechanism, and thus to actuate the stamp, the register, and the bell. The effect of this construction is to preclude the stamp, the register, and the bell from acting except when the tripping-wires have thus been moved on their shafts by the advance of a ballot deposited through the prescribed aperture.

My invention consists in the combination of devices herein described, and particularly set forth in the appended claims.

Figure 1:
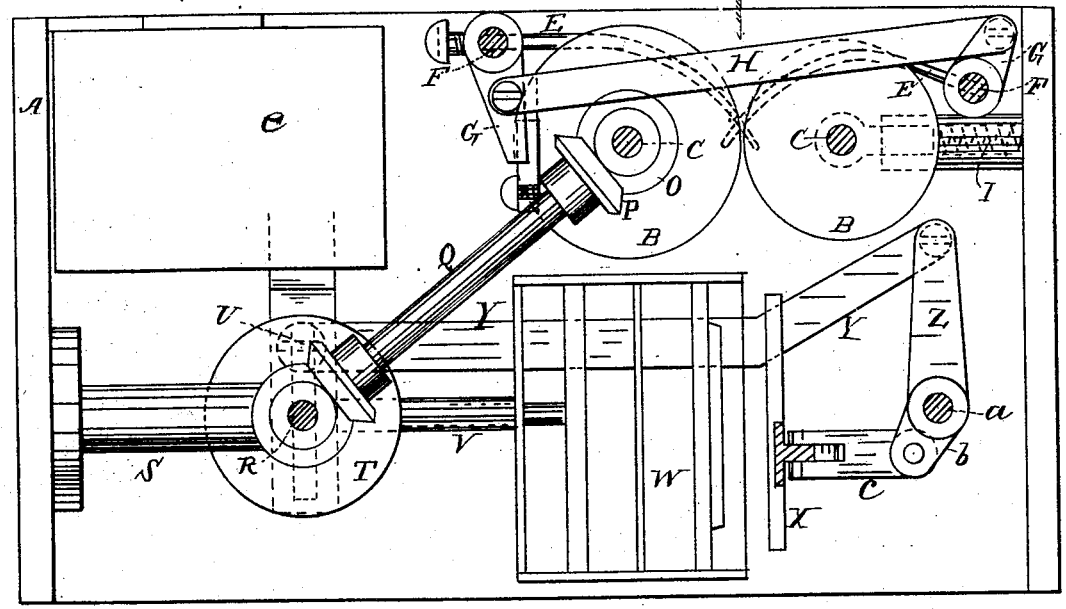
Figure 2:
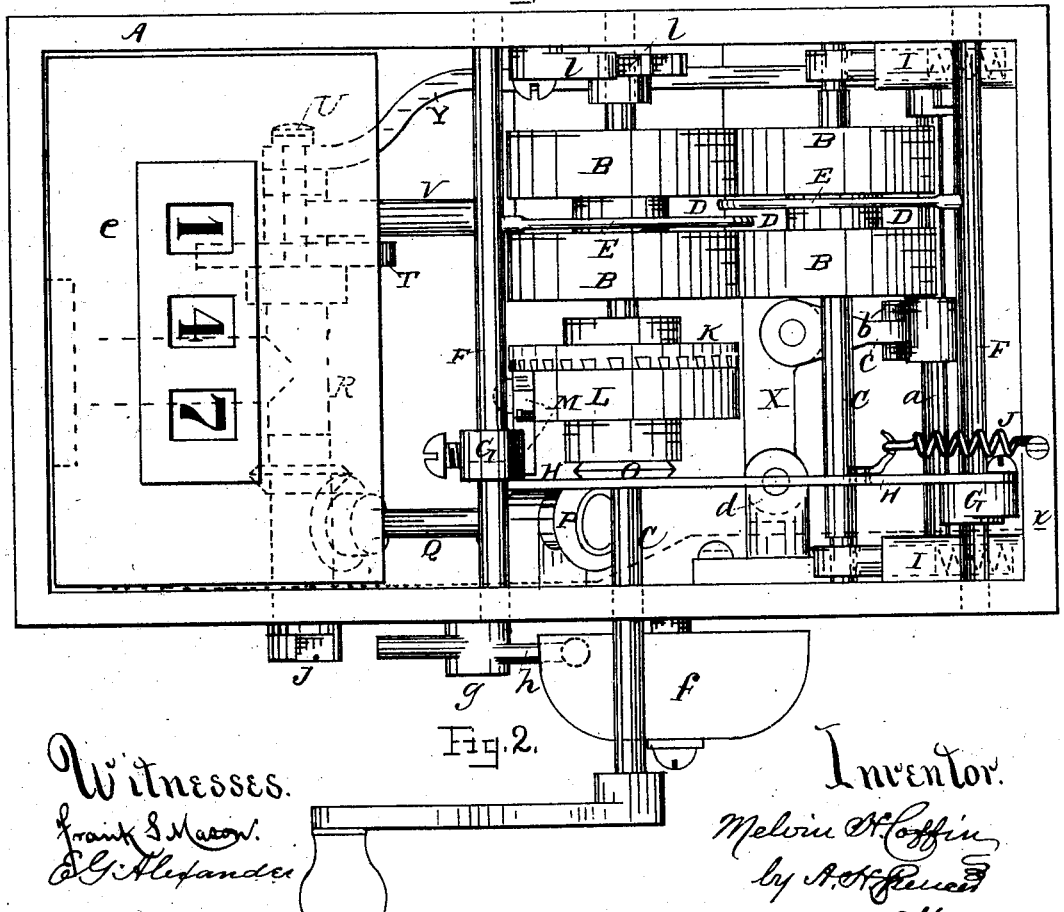
Figure 3:
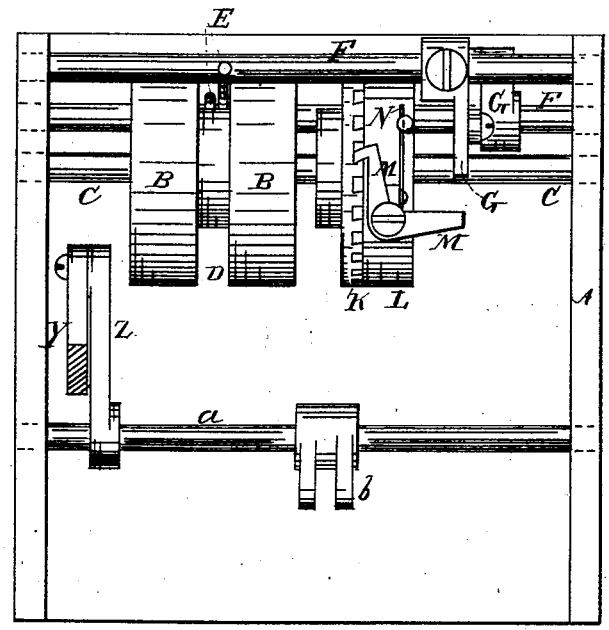
Figure 4:
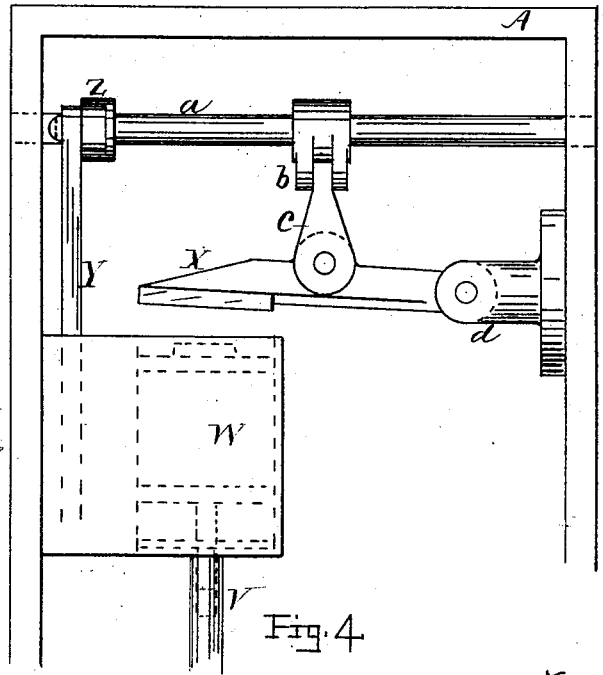
Figure 5:
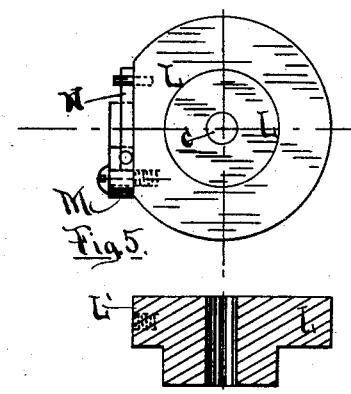
Figure 7:
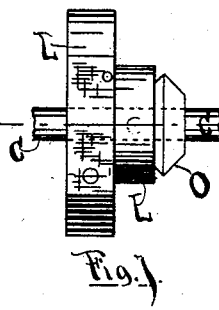
Figure 9:
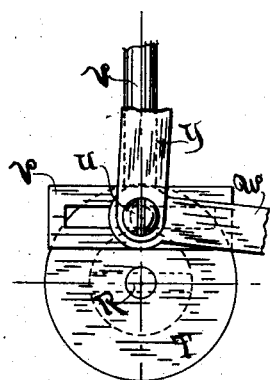
Figure 10:
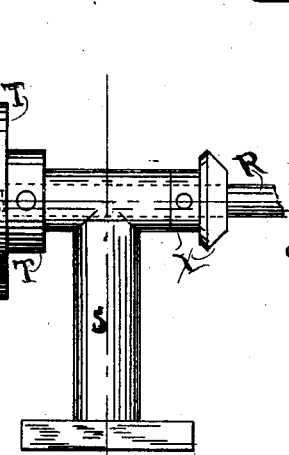
Figure 11:
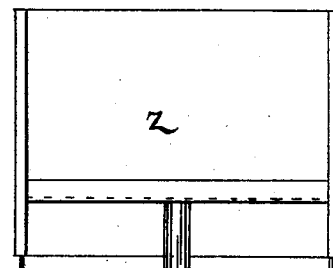
Figure 11:
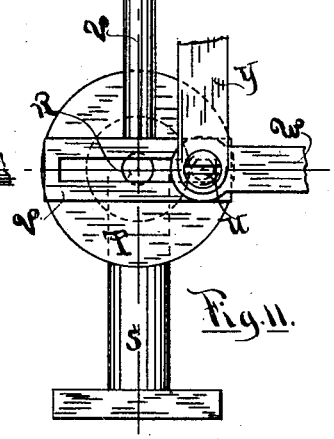

In the drawings, Figure 1 is a side elevation of the mechanism, the side of the case removed, with parts affixed to it, and showing the shafts in section about on the irregular line $x\,x$ of Fig. 2. Fig. 2 is a plan view, with top of the box removed. Fig. 3 is an end elevation, with registering mechanism, stamp, and swinging plate removed, to show details of the feed-roller, trip-levers, and clutch mechanism. Fig. 4 is a detail of the stamp and swinging plate. Figs. 5 to 8 are details of the clutch mechanism, and Figs. 9 to 11 parts of the stamp-operating apparatus.

A represents the case, which incloses the working parts, except the alarm, and is fixed upon or within the upper part of the receptacle for the ballots.

B B are two feed-rollers revolving on shafts C, and deeply grooved, as at D.

E E are two tripping-levers fixed in rock-shafts F, and crossing each other at their free ends in said grooves D.

G G are arms projecting from the rock-shafts and connected by an oblique pivoted bar, H, causing the shafts and their tripping levers to move in unison.

The bite of the rollers B and the intersection of the tripping-levers is immediately beneath the opening in the top of the case through which the ballot is inserted. When a ballot is to be cast, it is introduced edgewise or endwise through the opening and is caught by the feed-rollers and carried against the curved upper edges of the tripping-levers E.

The wires E bear lightly against the ballot on opposite sides and prevent it from being crowded into either of the grooves D. There may be two or more grooves in each roller and a tripping-wire in each groove. The advance movement of the ballot thus carries downwardly the free ends of the tripping-levers, turning their rock-shafts F and arms G through a short arc, and moving the connecting-bar H longitudinally against the resistance of a light spring, J, which tends to restore the levers to their raised position. One of the feed-rollers is represented in Figs. 1 and 2 as having spring-bearings I, to provide against injury should any thick object happen to pass through.

Figure 8:
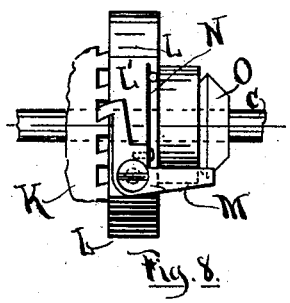
Figure 6:
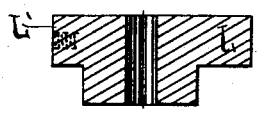

On the crank-shaft C is a clutch mechanism consisting of a toothed ring, K, made fast on the shaft, and an adjacent ring, L, loose thereon, but carrying on its flattened side L' a pivoted pawl, M, engaging with the teeth of ring K, as best shown in Figs. 3 and 8. A spring, N, holds the parts normally engaged. The pawl M has a projecting tail which strikes the arm G and disconnects the members of the clutch, except when said arm is swung backward by the entrance of a ballot depressing the levers E, at which time the pawl passes the arm, continues engaged, and the other parts of the mechanism are operated, as will now be explained.

The loose member L of the clutch has formed on or fixed to its hub a bevel gear-wheel, O, which meshes with a like wheel, P, on a shaft, Q, and this shaft is similarly connected with another one, R, having its bearing in a suitable hanger, S. (See Figs. 1 and 2, and the detail, Figs. 10 and 11.) The shaft R carries an arm or disk, T, with a projecting crank-pin, U, which works in a transverse slot formed in the end of a reciprocating bar, V, as indicated in dotted lines in Fig. 1, and in full lines in the detail, Figs. 9 to 11. This bar V is the stem of a reciprocating stamp, W, preferably of the reversible self-inking style; but it may be of any desired construction.

The reciprocating stroke of the stamp W is so timed as to bring the stamp to bear on the back of the ballot just as the feed-rollers are releasing it and before it drops into the box. Any suitable pad or block may serve as a support against which the ballot is pressed while the stamp is acting. I have, however, provided a swinging plate, X, worked by a connection from the shaft R, so as to move in unison with the stamp toward the ballot from opposite sides. The drawings represent this connection through a bar, Y, running from the crank-pin U, with an offset to an arm, Z, on a shaft, a, which shaft has another arm, b, with a link, c, pivoted to the swinging plate X, the plate being pivoted to a standard, d, Fig. 4. This arrangement of the parts leaves a clear passage for the ballot and brings it at the proper time between the stamp and the swinging plate.

A registering mechanism of suitable character is shown at Figs. 1 and 2. It is worked by a connecting-rod, preferably from the crank-pin U, which actuates a swinging pawl, and thereby gives the requisite movement to the apparatus to correctly count the ballots cast. I have not attempted to show or describe the details of this mechanism, as I lay no claim thereto. The figures indicating the number of ballots cast show through an opening in the top of the case or box.

The alarm-bell $f$ is represented outside the case A, but may be placed within it. A spring-pressed hammer, $h$, pivoted at $g$, is caused to strike the bell for each ballot cast. The drawings show in Fig. 2 an arm, $j$, mounted on the end of shaft R, and arranged at each revolution to act on the tail of the hammer-lever, so as to cause the hammer to strike a blow. It is obvious, however, that this part of the apparatus may be otherwise arranged. In Fig. 2 a ratchet and pawl, $l$, are shown for the purpose of preventing turning the wrong way.

I claim as my invention—

1. In a ballot-box, two plain feed-rollers, each with one or more peripheral grooves, in combination with two or more pivoted trip-wires extending from opposite sides of said rollers and crossing each other at the bite of the rollers, and with a connecting-rod for the arms of the trip-wires to cause them to act in unison, for the purpose set forth.

2. In a ballot-box, two feed-rollers peripherally grooved, and two or more pivoted tripping-wires working therein, in combination with a ratchet-clutch mounted on the axis of one of the rollers, one member of said clutch being fast and one loose thereon, and having, respectively, an annular ratchet and a pivoted pawl, said pawl engaging at each revolution with an arm on the axis of one of the tripping-wires, for the purpose set forth.

3. In a ballot-box, two feed-rollers grooved peripherally and two pivoted trip-wires working and crossing each other in such grooves, in combination with an oblique connecting-bar uniting two arms projecting from the axes of the trip-wires, and with a spring retracting said bar to cause one of said arms to engage and trip the pawl of the clutch mechanism, for the purpose set forth.

4. In a ballot-box, two feed-rollers peripherally grooved with two or more pivoted tripping-wires working therein, in combination with a reciprocating stamp or die actuated from the clutch mechanism, tripped by said wires, so as to move only when a ballot is passing through the machine, for the purpose set forth.

In testimony whereof I have signed my name to this specification, in the presence of two subscribing witnesses, on this 17th day of November, A. D. 1886.

MELVIN H. COFFIN.

Witnesses:
A. H. SPENCER,
THOS. J. KENNY.